July 3, 1934.　　　　R. E. ROHNE　　　　1,964,894
VEHICLE
Filed Dec. 9, 1929　　　6 Sheets-Sheet 1
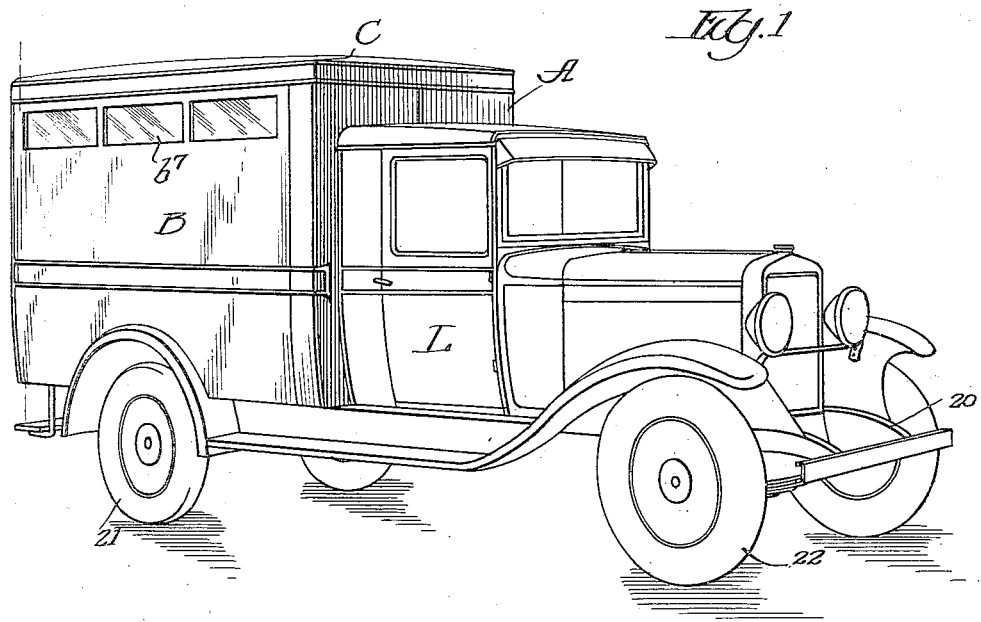
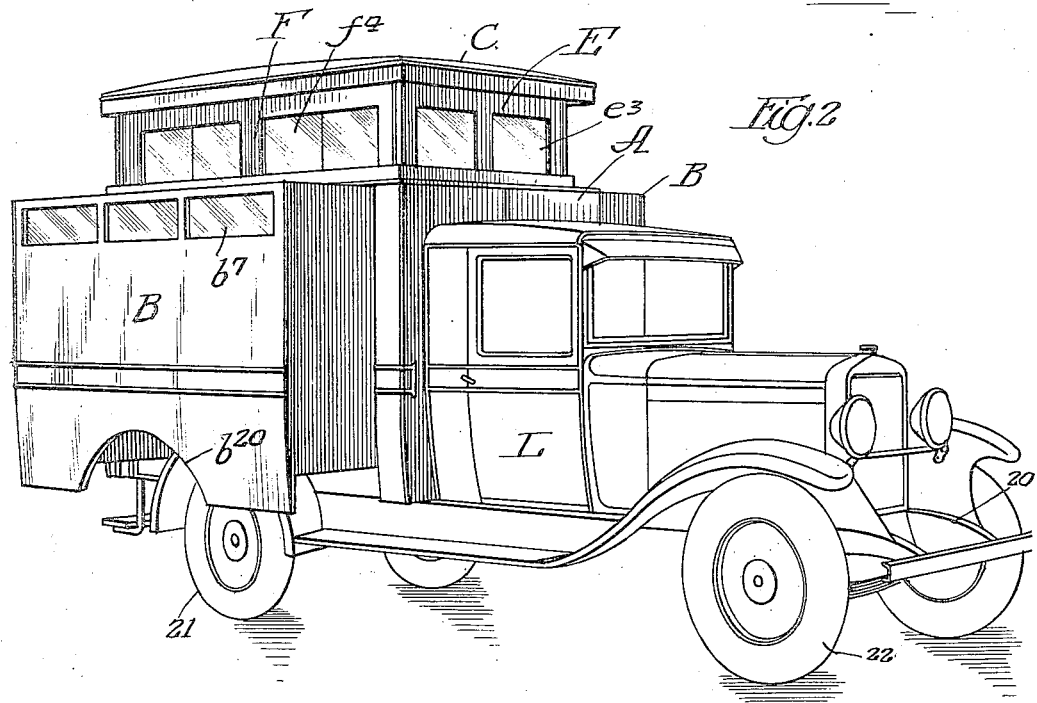
Inventor:-
Robert E. Rohne
By Fred Gerlach Atty.

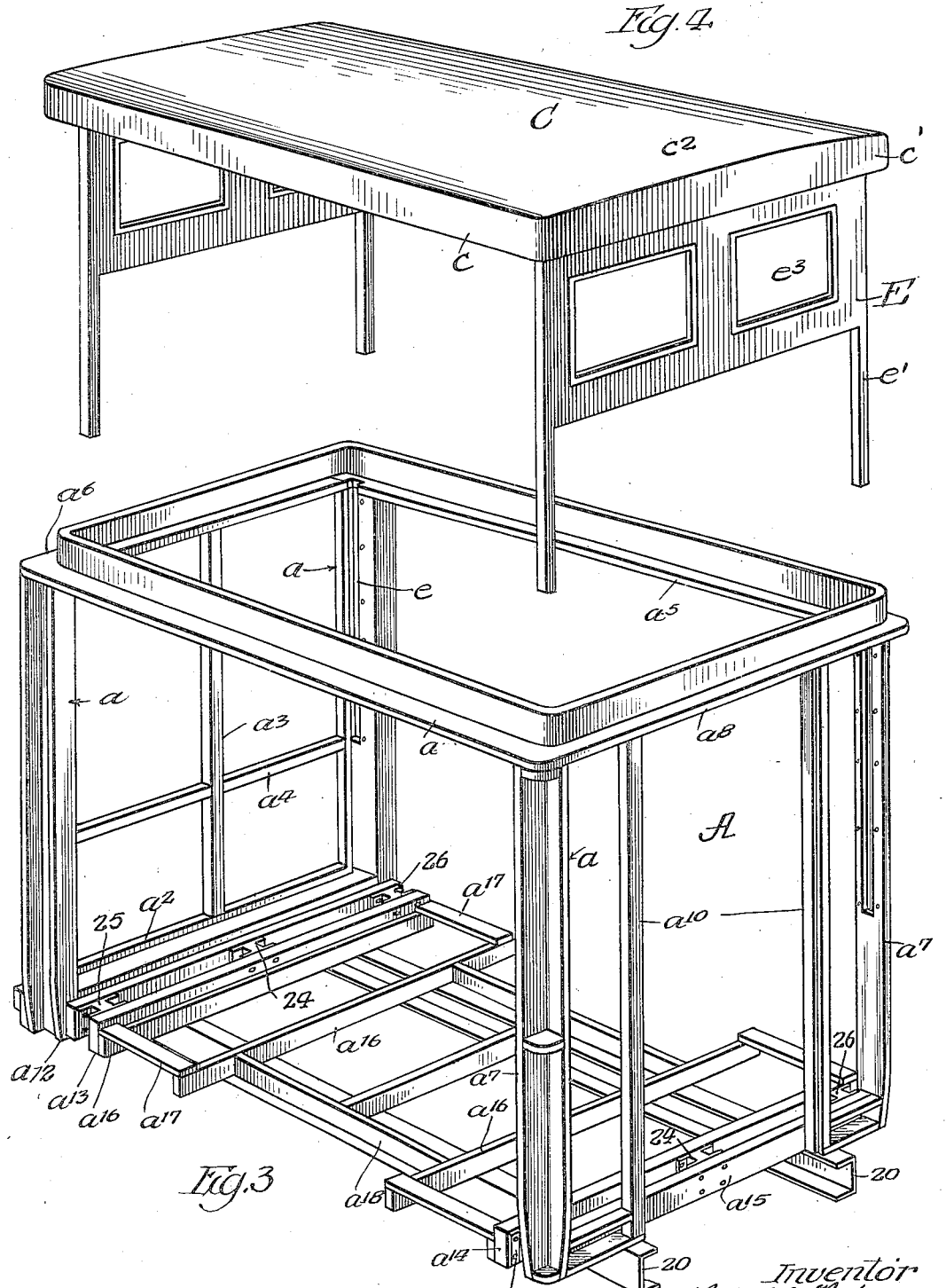

July 3, 1934. R. E. ROHNE 1,964,894
VEHICLE
Filed Dec. 9, 1929 6 Sheets-Sheet 3
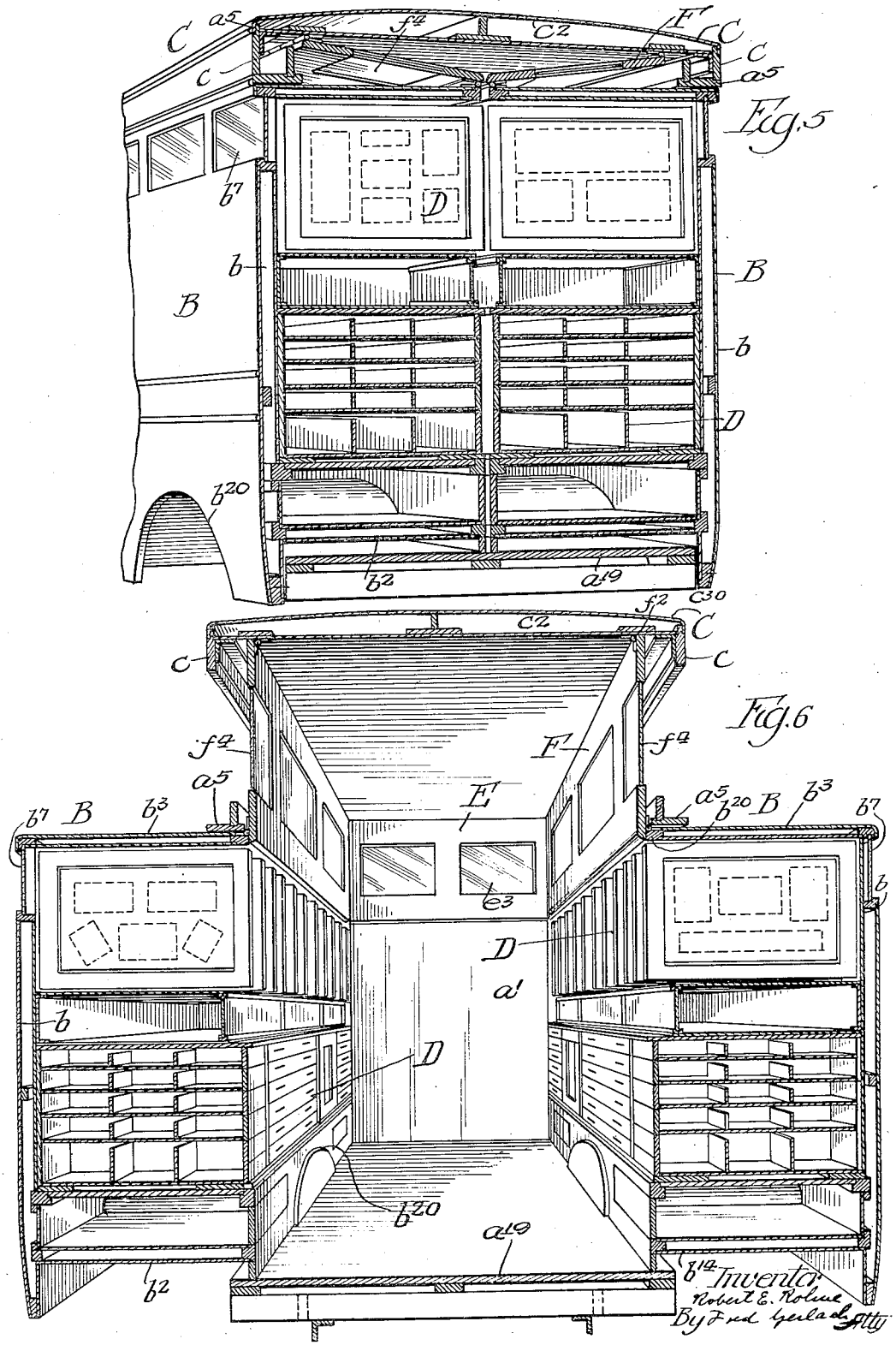

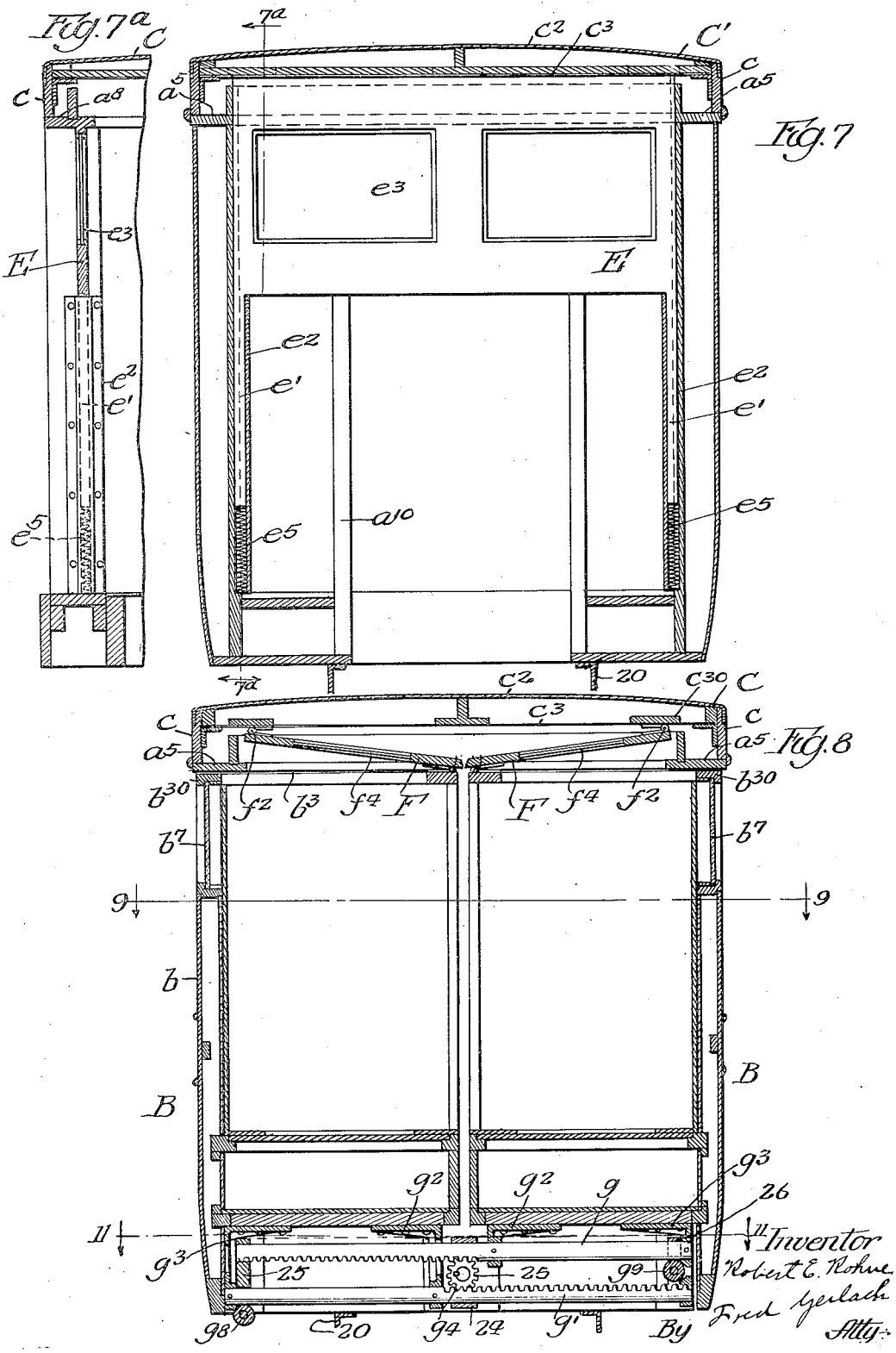

July 3, 1934.         R. E. ROHNE         1,964,894
VEHICLE
Filed Dec. 9, 1929         6 Sheets-Sheet 5

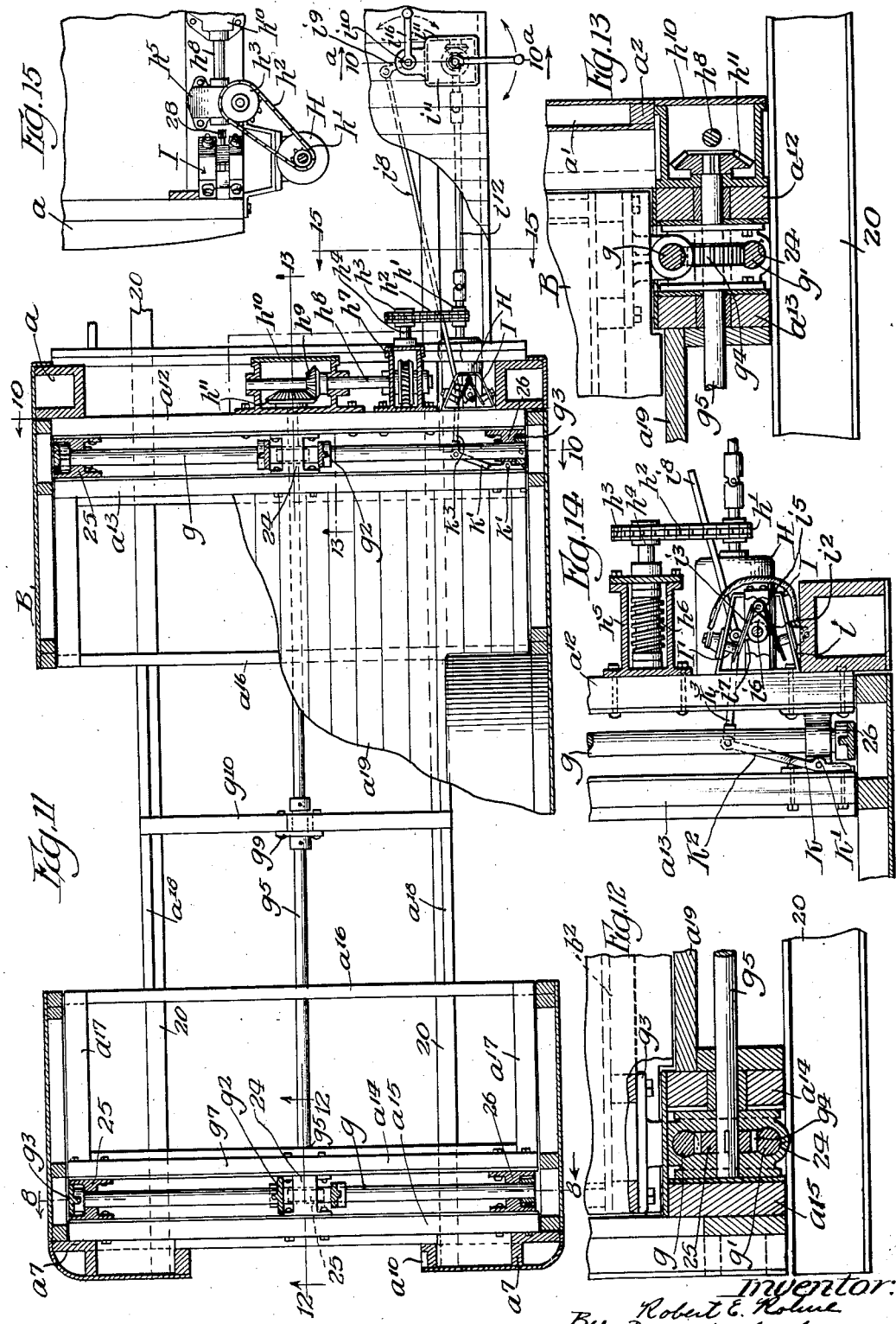

Patented July 3, 1934

1,964,894

UNITED STATES PATENT OFFICE 1,964,894

VEHICLE

Robert E. Rohne, Chicago, Ill., assignor to Expando Company, Chicago, Ill., a corporation of Delaware Application December 9, 1929, Serial No. 412,613

15 Claims. (Cl. 296—26)

The invention relates to automobiles, and its objects are to provide: an improved closed expansible vehicle body which comprises a rigid skeleton or frame structure, box-like sections transversely slidable in said structure, and a vertically movable roof, is adapted to serve as a sales or display room for merchandise, is easily and quickly expansible to provide the necessary room inside of the body for the inspection or handling of the goods, and is readily contractible for road travel; an improved body with expansible side sections each having side, end, and top walls rigidly connected together, and adapted to contain equipment for displaying goods, the sections being movable in back of and independently of the driver's cab or seat, so that only the portions of the body containing the equipment and merchandise will be shifted transversely in expanding and contracting the body; an improved body having a roof or top which is movable relatively to the expanded side sections to provide the desired head-room between the side-sections when the body is expanded; an improved body with mechanism for simultaneously and transversely shifting both of the side sections and the roof to expedite the expansion and contraction of the body, because when the vehicle is used for displaying the goods, it is frequently necessary to expand and contract the body; and an improved expansible body which is simple in construction, and can be readily applied to a chassis of standard construction without alteration thereof. Other objects will appear from the detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views: Fig. 1 is a perspective of a vehicle embodying the invention, the body being contracted for road travel. Fig. 2 is a perspective, the body being expanded to provide a salesroom inside thereof. Fig. 3 is a perspective of the rigid frame-structure of the body. Fig. 4 is a perspective of the roof and end-panels attached thereto. Fig. 5 is a transverse section with the body contracted. Fig. 6 is a similar section with the body expanded. Fig. 7 is a vertical section on the line 7—7 of Fig. 9. Fig. 7a is a section on the line 7a—7a of Fig. 7. Fig. 8 is a vertical section on the line 8—8 of Fig. 11. Fig. 9 is a horizontal section on the line 9—9 of Fig. 8. Fig. 10 is a vertical section on the line 10—10 of Fig. 11. Fig. 10a is a section on the line 10a—10a of Fig. 11. Fig. 11 is a horizontal section on the line 11—11 of Fig. 8. Fig. 12 is a section on the line 12—12 of Fig. 11. Fig. 13 is a section on the line 13—13 of Fig. 11. Fig. 14 is a sectional plan and Fig. 15 a front elevation of the mechanism for controlling the mechanism for shifting the body-sections.

The invention is exemplified in a vehicle comprising a chassis, including traction wheels 21, steering wheels 22, a rigid frame 20, and a motor for propelling the vehicle, and transmission mechanism for driving the traction wheels, as well understood in the art. The chassis may be of any standard construction. The improved expansible body is supported on the frame 20.

The body comprises a rigid skeleton or frame-structure A which is fixed on the chassis-frame 20; a pair of side or body-sections B, B which are slidable transversely in the skeleton to expand the body and provide an enclosed room when its contents are to be displayed or rendered accessible, and to contract the body when the vehicle is to travel on the road; and a roof or top C which is vertically movable to provide the desired head-room in the body between the side sections when the body is expanded.

An operator's cab L, containing a seat 1, is fixedly mounted on the chassis frame 20 in front of the front-member of the frame-structure A, so that the vehicle-body may be expanded and contracted without disturbing or changing the position of the cab.

The skeleton or frame structure A (Fig. 3) comprises; a front member built up of a pair of front corner-posts or uprights $a$ rigidly cross-connected at their upper ends by a member $a^6$ and at their lower ends by a bar $a^2$, a vertical brace $a^3$, a horizontal brace $a^4$, and a sheathing $a'$, all fixed together to form a rigid member to form and enclose the front of the body; a rear member built up of a pair of rear corner-posts or uprights $a^7$, a cross-member $a^8$ rigidly connecting the upper ends of said posts, uprights $a^{10}$, and a sheathing $a^{11}$, all rigidly secured together to form a fixed rear-member of the body; a pair of longitudinal bars $a^5$, rigidly connecting the upper ends of the front and rear corner-posts and forming, together with cross-members $a^6$ and $a^8$, a rigid, upper, rectangular structure on which the roof will seat; and a lower framework including a pair of front cross-bars $a^{12}$, $a^{13}$, which are secured in spaced relation by a central bracket 24 and adjacent their ends by brackets 25, 26, and one of which is fixed to the lower ends of the front corner-posts $a$, a pair of rear cross-bars $a^{14}$, $a^{15}$ which are similarly secured in spaced relation by brackets 24, 25, 26, and one of which is fixed to the rear corner-posts $a^7$ and uprights $a^{10}$, and a framing composed of cross-bars $a^{16}$ and longitudinal bars $a^{17}$, $a^{18}$, on which a fixed floor $a^{19}$ is laid. The lower cross-bars are all secured, as by bolts, to the chassis-frame 20, so that the structure A will be fixed and will serve to guide the side-sections B and to support the roof C. The structure A exemplifies one which is rigid throughout, forms the front and back of the body, and is adapted to carry the vertically movable roof and the slidable side-sections. The rear of structure A is provided with an opening for entering and leaving the room in the body and a hinged door 27 for closing said opening. The floor $a^{19}$ underlies the side sections B and is of sufficient width to extend between the inner ends of said sections when they are in their outermost position.

Each of the side sections B, B comprises a side-wall $b$, a bottom-wall $b^2$, a top wall $b^3$, a front end wall $b^4$, and a rear end wall $b^5$, all rigidly secured together to form a rigid box-like unit. These sections extend longitudinally between the front and rear walls and under the rails $a^5$ of the rigid structure A. Each body section B has a suitable equipment D for storing and displaying merchandise, and the inner side of each section is open so that the merchandise will be accessible for inspection or handling when the sections are spread apart. When the sections are in their innermost position, their inner sides will be substantially together or in close proximity at the center of the body; and their outer sides will be substantially aligned with the front and rear corner posts of the skeleton A, to form a closed body contracted to the standard width for road travel. When the sections are spread apart, their inner sides will be approximately aligned with the corner posts of the skeleton frame to provide a large room or space in the body and between the sections from which the merchandise can be examined or handled or in which the mechandise can be handled. These side sections form box-like units containing the equipment for storing and displaying the merchandise, and when the sections are spread apart, the equipment and merchandise will be disposed at the sides of the space in the body. When the sections are spread apart, their side, end, top and bottom walls will be disposed outwardly of the structure A and will, with the latter, form an expanded completely enclosed body. If desired plates of glass $b^7$ may be placed in upper portions of side-walls $b$ of the side-sections, to admit light to the equipment or room in the body when the side sections are expanded. This equipment may be varied according to the goods to be stored or displayed, and may consist of drawers, racks, garment-hooks, according to the merchanse which is to be sold or exhibited in the vehicle. Each side section is recessed at $b^{20}$ to clear the wheels 21, when the body is expanded.

The roof or top C is built up of suitable material, and comprises longitudinal side-rails $c$, front and rear end rails $c'$, and a top wall $c^2$, all rigidly secured together, and is vertically movable relatively to the top of frame-structure A, so that when the body is contracted, the top will be sufficiently low for road travel, and when the body is expanded, the top will be sufficiently high to provide convenient head-room for persons inside of the body. When the roof is lowered so the body will not be excessive in height for road travel, the rails $c$ and $c'$ will rest on the horizontal members of the rails $a^5$ and cross-rails $a^6$ to form a tight closure over the top of the body. Vertical panels E, E are rigidly secured to and depend from the top C, and these are slidable in the structure A to guide the roof vertically, and to close the spaces at the front and rear between the roof and the structure A, when the roof is raised. The front panel E is slidable in vertical grooves $e$ of the front corner posts $a$, and the rear panel E is slidable in similar grooves in the rear corner post $a^7$. Legs $e'$ on said panels are slidably confined in guides $e^2$, which are secured to the inner faces of the corner posts respectively, to guide the roof and panels vertically. Each panel E is preferably provided with transparent plates $e^3$, to admit light to the room inside of the body when the roof is raised.

Folding panels F are provided to close the vertical spaces between the roof and the inner margins of the top walls of sections B when the roof is raised and the sections are spaced apart, and these panels also serve to raise and lower the roof through the transverse movement of the side-sections. One end of each panel F is hinged to the inner margin of the top wall $b^3$, and at its other end is hinged, as at $f^2$, to the roof C. Panels F extend longitudinally between the front and rear vertically slidable panels E, to close the vertical spaces between the side sections and the roof, when the latter is raised, and may be, if desired, provided with transparent plates $f^4$, to admit light into the room in the body from the sides of the vehicle. When the body is contracted for road travel, the panels F will be folded into the space between the top walls of the side sections and the roof (Figs. 5 and 8). As the side sections are expanded the lower ends of the panels F will be moved outwardly, and this will cause the outer or upper ends of the panels to lift the vertically slidable roof until the panels F are substantially in the vertical position shown in Fig. 6. Springs $e^5$ are confined in guides $e^2$ and under legs $e'$ of panels E, and apply initial lifting force to the roof and facilitate its initial upward movement to aid in initially moving the inner ends of panels E outwardly. This exemplifies a construction in which the roof of suitable width for road travel or corresponding to the contracted body is raised relatively to the rigid structure A, and the rigid top walls of the transversely slidable side-sections, to provide head-room over the space between the inner sides of the side sections, so that the salesman and customers may conveniently stand in the body and examine the merchandise. It also exemplifies a construction by which the roof is raised relatively to the tops of the side sections by the panels or members which form vertical closures between the roof and the tops of the side sections, so that separate operating mechanism for manipulating the roof may be dispensed with.

The side sections B are guided and shifted transversely by similar mechanisms adjacent the front and back of the body. Each of said mechanisms comprises a transverse rod $g$, fixed in inner and outer brackets $g^2$, $g^3$, which are fixed to the floor of one of the side sections and a transverse rod $g'$ similarly fixed to the other section. The rods $g$, $g'$ are disposed one above the other, and provided with rack-teeth to engage respectively the top and bottom of a pinion $g^4$. Rod $g$ is secured to slide above the pinion, in the bearing brackets 24 and 26, and rod $g'$ is slidably guided below the pinion, in bearing brackets 24, 25. A pinion $g^4$ is provided for each pair of rods $g$, $g'$ and both pinions are fixed to a central longitudinal shaft $g^5$ which is journalled in brackets 24 which are fixed between the cross-bars $a^{12}$, $a^{13}$, $a^{14}$ and $a^{15}$ of the frame structure A. These pinions are adapted simultaneously and equidistantly to shift the side sections B in opposite directions to expand or contact the body. Rollers $g^8$, on which rods $g'$ ride, are mounted in brackets 25, and rollers $g^9$ on which rods $g$ may ride, are journalled in brackets 26. By providing similar guiding mechanisms at the front and rear of the body, the sections B are guided to move rectilinearly, so that there will be no cramping which will interfere with their free movement. This exemplifies mechanism for simultaneously and equidistantly shifting the box-like side sections in opposite directions, so that the vehicle body may be quickly expanded or contracted, as frequently necessary when the vehicle is used as a travelling sales or display room.

An electric motor H is connected to operate the mechanism for shifting the sections B through reducing gearing. This motor is of the reversible type, so the gearing may be driven in opposite directions to rotate shaft $g^5$ to operate pinions $g^4$ to expand or contract the vehicle body. This gearing comprises a sprocket-wheel $h'$ fixed to the shaft of said motor, a chain $h^2$ driven by sprocket $h'$, a sprocket $h^3$ fixed to a shaft $h^4$, which is mounted in a gear-case $h^5$ which is fixed to the front of cross-bar $a^{12}$; a worm wheel $h^6$, fixed to shaft $h^4$ inside of the case $h^5$, a worm gear $h^7$ in said case and fixed to a transverse shaft $h^8$, bevelled pinion $h^9$ in a gear-case $h^{10}$ and fixed to shaft $h^8$ and a gear $h^{11}$ meshing with gear $h^9$ and fixed to the front end of shaft $g^5$. The operation of the motor in one direction will cause this gearing to rotate shaft $g^5$ and pinions $g^4$ to operate rods $g$, $g'$ outwardly to spread the sections B, and the operation of the motor in reverse direction will operate the gearing to shift said sections together.

The means for controlling the operation of the motor H comprises a set of switches I which are suitably connected to control the operation of the motor in one direction and a set of switches I' which are connected to control the operation of the motor in the opposite direction. These switches are mounted in a frame $i$ and may be of any suitable construction. A spring plate $i^2$ is adapted to close the switches I and a similar plate $i$ is adapted to close the switches I'. These plates are pivoted to the frame $i$, and are alternately operable by a centrally disposed cam $i^5$ which is fixed to a vertical shaft $i^6$ which is mounted in frame $i$. Rotation of shaft $i^6$ in one direction will shift cam $i^5$ to force plate $i^2$ into position to close the switches I, and turning of the shaft in the opposite direction will operate said cam to shift plate $i^3$ to close switches I'. An arm $i^7$ is fixed to the lower end of shaft $i^6$, and is connected by a rod $i^8$ to an arm $i^9$ on a vertical shaft $i^{10}$ which is mounted on a casing $i^{11}$ which is suitably fixed to the chassis frame. The upper end of shaft $i^{10}$ has a terminal adapted to receive a removable crank $i^{16}$ by which it may be oscillated to shift the cam $i^5$ to operate either of the switch sets. To expand the vehicle, the operator will apply the crank to shaft $i^{10}$ and turn it in one direction to operate cam $i^6$, so that it will shift the switches for causing the motor to operate in that direction, whereupon the motor will, through the gearing described, impart rotation to the shaft $g^5$. To contract the body the operator will turn shaft $i^{10}$ in the opposite direction to cause cam $i^6$ to close the switches so the motor will rotate reversely.

An automatic throw-out is provided for stopping the motor when the vehicle has been fully expanded or contracted, and this consists of a dog $k$ which is fixed to a shaft $k'$ which is pivoted to one of the bars $a^{13}$. An arm $k^2$ is fixed to the lower end of shaft $k'$, and a rod $k^3$ is pivoted to arm $k^2$ and to the arm $i^7$ which is fixed to cam-shaft $i^6$. The inner end of dog $k$ is adapted to be struck by one of the inner brackets $g^2$, which is fixed to one of the side sections when the latter reaches its outermost position, so that the dog will operate arm $k^2$, link $k^3$, arm $i^7$, and shaft $i^6$ to shift cam $i^5$ into its vertical position, so the cam will open the switches for the motor which were then closed, so the motor will stop. In contracting the vehicle body, as the side sections reach their innermost position, one of the outer brackets $g^3$ will engage the outer end of dog $k$, so it will rock and shift cam $i^5$ to release the switches into their neutral position and stop the motor.

For the purpose of providing means for manually operating the mechanism for shifting the side sections and roof in event that the electric motor H should be inoperative through the failure of current, a shaft $i^{12}$ is coupled to the shaft of said motor, and is extended into the housing $i^{11}$ where it is provided with a bevelled pinion $i^{13}$. A vertical shaft $i^{14}$ is journalled in the housing and carries a gear $i^{15}$ meshing with pinion $i^{13}$. The upper end of the shaft is polygonal to receive a crank $i^{16}$, through which, when it is applied to the shaft, the gearing for operating the shaft $g^5$ may be operated to shift the side sections inwardly or outwardly. This exemplifies mechanism whereby the gearing for expanding and contracting the body may be manually operated in event that the motor H is inoperative or the supply of current for operating it should fail.

When the vehicle is to travel over the road, the side sections will be contracted and the roof will be lowered, so that the height and cross dimensions of the body will be within the maximum width permitted for road travel. When the vehicle reaches a place where the merchandise is to be exhibited or sold, the operator will start motor H to operate the shifting mechanism to simultaneously expand the side-sections B with the merchandising equipment and goods therein, and the folding panels F will simultaneously raise the roof above the frame structure. The merchandise will then be displayed and the space between the body sections will form a convenient room of sufficient capacity for the salesman and one or more customers for the inspection of the goods. The lifting of the roof will provide sufficient head-room to permit persons of ordinary height to walk about conveniently in the room in the body. When the vehicle is to again travel over the road, the operator will control the shifting mechanism for sections B, to simultaneously move them inwardly, and while this occurs, panels F will simultaneously lower the roof onto the upper rails of the frame-structure. The body will then be completely enclosed and contracted to a height and width adapted for road travel. When the roof is lowered, it will be seated on the top portion of the frame-structure, so as to prevent dust and rain from entering the opening in the top of the frame-structure.

The invention exemplifies an automobile in which the body is transversely expansible and contracted in a rigid skeleton or frame-structure, and in which the equipment for the display and storage of merchandise can be stationarily mounted in the side sections, so that when the body is expanded, the goods will be displayed as desired for sale or examination. It exemplifies a vehicle body in which the expansible members are carried in a frame or skeleton which extends over the side sections and under the roof, and in which the roof is vertically adjustable relatively to the side sections to provide the additional head-room desired in the central portion of the vehicle when the vehicle body is expanded. It exemplifies mechanism for simultaneously operating all of the expansible parts, so that the expansion and contraction of the vehicle will be expedited, which is particularly advantageous when the vehicle is used as a travelling sales or display room for which purpose it is necessary to frequently expand and contract the body.

The invention is not to be understood as restricted to the details set forth, since these may be modified within the scope of the appended claims, without departing from the spirit and scope of the invention.

This application is a continuance in part of an application for United States Letters Patent for improvements in expansible vehicle body filed by me April 12, 1924, Serial No. 706,152.

Having thus described the invention, what I claim as new and desire to secure by Letters Patent, is:

1. In a vehicle of the character described, the combination of a chassis; a rigid frame structure comprising a rectangular floor extending longitudinally of and secured fixedly to the chassis, substantially rectangular front and rear members projecting upwardly from the front and rear ends of the floor respectively and of less height than normal head height and a pair of longitudinally extending, laterally spaced rails extending between the upper corners of said front and rear members and secured fixedly thereto; a pair of elongated, unitary and rigid body sections extending longitudinally between the front and rear upper members and under the rails of the frame structure and mounted so that they may be shifted bodily from a contracted position wherein they lie side-by-side in the frame structure into an expanded position wherein they are separated to provide a space therebetween, and each comprising a rigid bottom engaging slidably the floor of the frame structure, front and rear end walls extending upwardly from the ends of the bottom and adapted respectively to form continuations of the front and rear upright members when the sections are in their expanded position, a top wall between the upper ends of the front and rear end walls and an outer side wall having the lower portion thereof projecting below the bottom and beneath the aforesaid floor of the frame structure; a roof over the frame structure adapted to cover the space between the sections when the latter are in their expanded position and movable vertically so that it may be raised to provide head room in such space; mechanism for conjointly shifting the body sections into and out of their expanded positions comprising elements disposed beneath the floor of the frame structure and located entirely between, and lapped by, the projecting lower portion of the side walls of the body sections; and means for raising and lowering the roof.

2. In a vehicle of the character described, the combination of a chassis; a rigid frame structure mounted fixedly on the chassis and comprising a stationary, longitudinally extending, rectangular floor, and front and rear, substanitally rectangular upright members at the ends of the floor and a pair of elongated, unitary, box-like body sections extending longitudinally between the front and rear upright members of the frame structure and mounted so that they may be shifted bodily from a contracted position wherein they lie side-by-side in the frame structure into an expanded position wherein they are separated to provide a space therebetween; a roof over the frame structure for enclosing the space between the sections when the latter are in their expanded position; and mechanism for conjointly shifting the body sections into and out of their expanded position comprising a longitudinally extending, rotatable shaft positioned directly beneath the central portion of the stationary floor, a pinion on the shaft, a transversely extending rack attached to the bottom of one of the sections and meshing with the top part of the pinion and a second, transversely extending rack attached to the bottom of the other body section and meshing with the bottom part of said pinion.

3. In a vehicle of the character described, the combination of a chassis; a rigid frame structure mounted fixedly on the chassis and comprising an elongated, longitudinally extending floor, and front and back upright members extending upwardly from the ends of the floor; a pair of elongated, unitary body sections extending longitudinally between the front and rear members and mounted so that they may be shifted bodily from a contracted position wherein they lie side-by-side in the frame structure into an expanded position wherein they are separated to provide a space therebetween; a roof over the frame structure adapted to cover the space between the body sections when the latter are in their expanded position and movable vertically so that it may be raised to provide head room in such space; vertical end panels for closing the space between the ends of the frame structure and the roof when the roof is in its raised position, fixed to and extending downwardly from the roof ends and slidably associated with the front and back upright members of the frame structure; side panels for closing the space between the side margins of the roof and the inner and upper corners of the body sections when the roof is raised and the body sections are shifted apart, connected to the side margins of the roof and foldable between the roof and the tops of the body sections when the roof is lowered and the body sections are in their contracted position; mechanism for shifting the body sections into and out of their expanded position; and means for raising and lowering the roof.

4. In a vehicle of the character described, the combination of a chassis; a rigid frame structure mounted fixedly on the chassis and comprising an elongated, longitudinally extending floor and front and back upright members extending upwardly from the ends of the floor; a pair of elongated, unitary body sections extending longitudinally between the front and rear members and mounted so that they may be shifted bodily from a contracted position wherein they lie side-by-side in the frame structure into an expanded position wherein they are separated to provide a space therebetween; a roof over the frame structure adapted to cover the space between the body sections when the latter are in their expanded position and movable vertically so that it may be raised to provide head room in such space; vertical end panels for closing the space between the ends of the frame structure and the roof when the roof is in its raised position; side panels for closing the space between the side margins of the roof and the sides of the frame structure when the roof is raised and the sections are shifted apart to form a space therebetween, pivoted to said side margins of the roof and to the inner and upper corners of the body sections in such a manner that they operate automatically to raise the top when the body sections are shifted apart into their expanded position and to lower the top when the body sections are shifted into their contracted position; and mechanism for conjointly shifting said body sections into and out of their said expanded position.

5. In a vehicle of the character described, the combination of a chassis; a rigid frame structure mounted fixedly on the chassis and comprising an elongated, longitudinally extending floor and front and back upright members extending upwardly from the ends of the floor; a pair of elongated unitary body sections extending longitudinally between the front and rear members and mounted so that they may be shifted bodily from a contracted position wherein they lie side-by-side in the frame structure into an expanded position wherein they are separated to provide a space therebetween; a roof over the frame structure adapted to cover the space between the body sections when the latter are in their expanded position and movable vertically so that it may be raised to provide head room in such space; vertical end panels for closing the space between the ends of the frame structure and the roof when the roof is in its raised position, fixed to and extending downwardly from the roof ends and slidably associated with the front and back upright members of the frame structure; side panels for closing the space between the side margins of the roof and the sides of the frame structure when the roof is raised and the sections are shifted apart to form a space therebetween, pivoted to said side margins of the roof and to the inner and upper corners of the body sections in such a manner that they operate automatically to raise the top when the body sections are shifted apart into their expanded position and to lower the top when the body sections are shifted into their contracted position; and mechanism for conjointly shifting said body sections into and out of their said expanded position.

6. In a vehicle, the combination of a chassis; a rigid frame structure mounted fixedly on the chassis; a pair of longitudinally extending body sections positioned in side-by-side relation in the frame and mounted so that they may be slid transversely from a contracted position wherein they lie together to an expanded position wherein they are separated and form a space therebetween; a roof positioned over the frame structure and movable vertically so that it may be raised in order to provide head room for the space formed when the sections are in their expanded positions; and coacting mechanism for simultaneously shifting the body sections into their expanded position and raising the roof and for simultaneously retracting said body sections and the roof.

7. In a vehicle of the character described, the combination of a chassis; a rigid frame structure mounted fixedly on the chassis; a pair of longitudinally extending, unitary body sections positioned in side-by-side relation within the frame structure and mounted so that they may be shifted from a contracted position wherein they substantially abut to an expanded position wherein they are separated and form a space therebetween; a roof over the frame structure mounted so that it is movable vertically in order that it may be raised to provide head room for the space formed when the body sections are in their expanded position; mechanism for conjointly shifting both sections transversely into and out of their contracted position; and means operated by the sections in response to shift thereof for simultaneously raising the roof when the sections are shifted into their expanded position and for lowering the roof when the sections are shifted into their contracted position.

8. In a vehicle of the character described, the combination of a chassis; a rigid frame structure mounted fixedly on the chassis and comprising front and back upright members; a pair of elongated, unitary, compartment-forming body-sections extending longitudinally between the front and rear members and mounted so that they may be shifted transversely from a contracted position wherein they lie side-by-side in the frame structure into an expanded position wherein they are separated to provide a space therebetween; a roof over said structure; mechanism for conjointly shifting the body sections into and out of their expanded position; an electric motor for driving said mechanism; and switch means for automatically stopping the motor when the sections reach their extended and contracted positions.

9. In a vehicle of the character described, the combination of a chassis; a rigid frame structure mounted fixedly on the chassis and comprising front and back upright members; a pair of elongated, unitary, compartment-forming body-sections extending longitudinally between the front and rear members and mounted so that they may be shifted transversely from a contracted position wherein they lie side-by-side in the frame structure into an expanded position wherein they are separated to provide a space therebetween; a roof over said structure; mechanism for conjointly shifting the body-sections into and out of their expanded position; a reversible electric motor for driving said mechanism; and switch means for automatically stopping the motor when the sections reach their expanded and contracted positions.

10. In a vehicle body of the character disclosed, the combination of: a fixed supporting body structure; a top bodily movable vertically to provide an intermediate space between said top and said structure; and means for elevating said top, said means comprising opposed separable members carried by said structure and movable in opposite directions outwardly in a horizontal plane, opposite elevating members each pivotally connected at its inner lower end to one of said separable members and at its outer upper end to said top, each elevating member being normally in collapsed position angled inwardly and downwardly, and means for simultaneously separating said separable members whereby the elevating members are moved to vertical positions to elevate and support said top.

11. In a vehicle body of the character disclosed, the combination of: a fixed supporting body structure; a top bodily movable vertically to provide an intermediate space between said top and said structure; and means for elevating said top, said means comprising opposed separable members carried by said structure and movable in opposite directions outwardly in a horizontal plane, opposite wall members each pivotally connected at its inner lower end to one of said separable members and at its upper outer end to said top, each wall member being normally in collapsed position angled inwardly and downwardly, and means for simultaneously separating said separable members whereby the wall members are moved to vertical positions to elevate and support said top and to form side walls between said top and said supporting structure.

12. In a vehicle body of the character disclosed, the combination of: a fixed supporting body structure; a top bodily movable vertically to provide an intermediate space between said top and said structure; means for elevating said top, said means comprising opposed separable members carried by said structure and movable in opposite directions outwardly in a horizontal plane, opposite elevating members each pivotally connected at its inner lower end to one of said separable members and at its outer upper end to said top, each elevating member being normally in collapsed position angled inwardly and downwardly, and means for simultaneously separating said separable members whereby the elevating members are moved to vertical positions to elevate and support said top; and means for closing said intermediate space when said top is elevated.

13. In a vehicle body of the character disclosed, the combination of: a fixed supporting body structure; a top bodily movable vertically to provide an intermediate space between said top and said structure; means for elevating said top, said means comprising opposed separable members carried by said structure and movable in opposite directions outwardly in a horizontal plane, opposite wall members each pivotally connected at its inner lower end to one of said separable members and at its upper outer end to said top, each wall member being normally in collapsed position angled inwardly and downwardly, and means for simultaneously separating said separable members whereby the wall members are moved to vertical positions to elevate and support said top and to form side walls between said top and said supporting structure; and means for closing said intermediate space between said wall members when said top is elevated.

14. In a vehicle, the combination of a vehicle frame; a rigid, elongated frame structure comprising front and rear upright members rigidly secured on the vehicle frame, and means rigidly and longitudinally connecting the upper ends of the front and rear upright members; a pair of body sections mounted to slide transversely and extending longitudinally between the front and rear upright members and under the longitudinal connecting means of the frame, each comprising a side, front, and rear end walls and a top wall, all rigidly secured together; a roof movable vertically over and relatively to the top of the frame structure; and side panels connected pivotally to the roof and the inner margins of the top walls, said panels being foldable between the roof and the top walls of the sections when the sections are contracted and slidable into vertical position when the roof is raised and the side sections are expanding and operating automatically to raise the roof when the body sections are expanded and to lower the roof when the body sections are contracted.

15. In an automobile of the character described, the combination of a chassis; a cab for the driver of the automobile mounted fixedly on the central portion of the chassis and directly behind the motor of said chassis; a rigid frame structure comprising a rectangular floor extending longitudinally of the chassis and secured fixedly to the rear end thereof, substantially rectangular front and rear upright members at the front and rear ends of the floor respectively and of proper height for road travel and a pair of longitudinally extending rails extending between the upper corners of the upright members and connected fixedly thereto; a pair of elongated, compartment-forming body-sections extending longitudinally between the upright members and under the rails and mounted so that they may be shifted bodily from a contracted position wherein they lie side-by-side and substantially fill the frame structure into an expanded position wherein they are separated to substantially the width of said structure and form a space therebetween, each of said sections comprising a bottom engaging slidably the floor of the frame structure, front and rear end walls extending upwardly from the ends of the bottom and adapted respectively to form continuations of the front and rear upright members when the sections are in their expanded position, a top wall between the upper ends of the front and rear end walls and an outer side wall, and having the various parts thereof connected rigidly together so that it is in the form of a unit; a roof over the frame structure mounted so that it may be shifted vertically from a position wherein it rests upon the rails and the upper ends of the upright members into a raised position wherein it provides head room for the space formed between the two body sections when the latter are in their expanded position; mechanism for conjointly shifting the sections into and out of their expanded position; and means for raising and lowering the roof.

ROBERT E, ROHNE.